(12) United States Patent
Martin et al.

(10) Patent No.: US 10,531,472 B2
(45) Date of Patent: Jan. 7, 2020

(54) COMMUNICATIONS SYSTEM, COMMUNICATIONS DEVICE AND METHOD OF COMMUNICATING

(71) Applicant: SONY CORPORATION, Tokyo (JP)

(72) Inventors: Brian Alexander Martin, Basingstoke (GB); Dimitris Koulakiotis, Basingstoke (GB); Jussi Kahtava, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 162 days.

(21) Appl. No.: 15/031,149

(22) PCT Filed: Oct. 28, 2014

(86) PCT No.: PCT/EP2014/073150
§ 371 (c)(1),
(2) Date: Apr. 21, 2016

(87) PCT Pub. No.: WO2015/063105
PCT Pub. Date: May 7, 2015

(65) Prior Publication Data
US 2016/0255638 A1 Sep. 1, 2016

(30) Foreign Application Priority Data
Oct. 31, 2013 (EP) ..................... 13191225

(51) Int. Cl.
*H04W 72/08* (2009.01)
*H04L 5/00* (2006.01)
(Continued)

(52) U.S. Cl.
CPC ......... *H04W 72/082* (2013.01); *H04L 5/0037* (2013.01); *H04L 5/0053* (2013.01);
(Continued)

(58) Field of Classification Search
CPC ............... H04L 5/0037; H04L 5/0053; H04W 72/0413; H04W 72/048; H04W 72/082;
(Continued)

(56) References Cited
U.S. PATENT DOCUMENTS 9,585,163 B2 * 2/2017 Lee ...................... H04W 76/14
9,686,666 B2 * 6/2017 Selen .................... H04W 8/005
(Continued)

FOREIGN PATENT DOCUMENTS

EP   1 545 148 A2   6/2005
WO   2010/109303 A1   9/2010
(Continued)

OTHER PUBLICATIONS

"3rd Generation Partnership Project; Technical Specification Group RAN; Study on LTE Device to Device Proximity services, (Release 12)," 3GPP TR 36.843 V0.1.0, Apr. 2013, (8 pages).
(Continued)

*Primary Examiner* — Robert J Lopata
(74) *Attorney, Agent, or Firm* — Xsensus LLP

(57) ABSTRACT

A communications system for device-to-device communications includes a group of plural communications devices, each configured to perform device-to-device communications via a wireless access interface with one or more other communications devices of the group. One of the communications devices is configured to detect interference in communications resources of the wireless access interface caused by signals transmitted by another communications device, and to provide, in response to detecting the interference, an indication of the interference to one or more of the communications device. By the communications device of the first group of communications devices detecting the interference and communicating an indication of the interference to the other members of the group, then members of
(Continued)

the group can adapt the transmission and reception of data via the wireless access interface to avoid resources of the wireless access interface which is subject to interference.

13 Claims, 10 Drawing Sheets

(51) Int. Cl.
 *H04W 72/04* (2009.01)
 *H04W 88/06* (2009.01)
(52) U.S. Cl.
 CPC ..... *H04W 72/048* (2013.01); *H04W 72/0413* (2013.01); *H04W 88/06* (2013.01)
(58) Field of Classification Search
 CPC ..... H04W 88/06; H04W 72/04; H04W 72/12; H04W 76/00; H04B 7/2121; H04B 7/2123; H04J 2203/0069; H04Q 2213/394
 USPC ........................................................ 370/329
 See application file for complete search history.

(56) References Cited

U.S. PATENT DOCUMENTS

| | | | |
|---|---|---|---|
| 2009/0005094 A1 | 1/2009 | Lee et al. | |
| 2010/0240312 A1 | 9/2010 | Peng et al. | |
| 2011/0255431 A1* | 10/2011 | Wang | H04L 5/0053 370/252 |
| 2011/0282989 A1* | 11/2011 | Geirhofer | H04L 67/104 709/224 |
| 2012/0250636 A1* | 10/2012 | Wang | H04W 72/08 370/329 |
| 2013/0272196 A1* | 10/2013 | Li | H04W 72/044 370/328 |
| 2013/0295976 A1* | 11/2013 | Patil | H04W 24/10 455/501 |
| 2013/0324114 A1* | 12/2013 | Raghothaman | H04W 76/023 455/426.1 |
| 2014/0018121 A1* | 1/2014 | Kang | H04W 76/023 455/513 |
| 2014/0128089 A1 | 5/2014 | Jang et al. | |
| 2014/0335875 A1* | 11/2014 | Li | H04W 8/005 455/450 |
| 2015/0023342 A1* | 1/2015 | Joo | H04W 56/0035 370/350 |
| 2015/0208453 A1* | 7/2015 | Yamazaki | H04W 8/005 370/329 |
| 2015/0230226 A1* | 8/2015 | Yoshizawa | H04W 76/14 370/329 |
| 2015/0257196 A1* | 9/2015 | Lee | H04W 36/0061 370/328 |
| 2015/0319796 A1* | 11/2015 | Lu | H04B 7/2615 370/330 |
| 2015/0373730 A1* | 12/2015 | Fujishiro | H04L 1/0003 455/450 |
| 2016/0007336 A1* | 1/2016 | Fukuta | H04W 52/383 455/426.1 |
| 2016/0165561 A1* | 6/2016 | Lee | H04W 76/14 370/350 |
| 2017/0164374 A1* | 6/2017 | Geirhofer | H04W 72/0493 |
| 2017/0332427 A1* | 11/2017 | Yamazaki | H04W 76/023 |
| 2017/0367135 A1* | 12/2017 | Fukuta | H04W 76/10 |

FOREIGN PATENT DOCUMENTS

| | | |
|---|---|---|
| WO | 2010/109303 A3 | 9/2010 |
| WO | 2012/019349 A1 | 2/2012 |
| WO | 2012/173443 A2 | 12/2012 |
| WO | 2013/087442 A1 | 6/2013 |
| WO | 2013/123638 A1 | 8/2013 |

OTHER PUBLICATIONS

"D2D RAN2 text proposal to RAN1 TR 36.843 with latest status after RAN2 #83bis," 3GPP TSG-RAN WG2 #83 Bis, R2-133699, Oct. 7-11, 2013, (4 pages).
"Study on LTE Device to Device Proximity Services," 3GPP TSG RAN Meeting #58, RP-122009, (6 pages) (Dec. 7, 2012 as shown at www.3gpp.org - /ftp/tsg_ran/TSG_RAN/TSGR_58/docs/).
"Agreements from TSG RAN on work on Public Safety related use cases in Release 12," TSG RAN Meeting #61, RP-13177, RAN Temporary Document, SA-WG2-TD, Sep. 3-6, 2013, pp. 1-6.
"3rd Generation Partnership Project; Technical Specification Group Services and System Aspects; Study on architecture enhancements to support Proximity Services (ProSe) (Release 12)," 3GPP TR 23.703 V0.5.0, Jul. 2013, (176 pages).
"Operator view on network control for Public Safety D2D Communications," 3GPP TSG-RAN WG2 Meeting #83bis, R2-133177, Oct. 7-11, 2013, (4 pages).
"Discussion on Out-of-coverage D2D communication for public safety," 3GPP TSG-RAN2#83, R2-132433, Aug. 19-23, 2013, (4 pages).
"Digital cellular telecommunications system (Phase 2+); Universal Mobile Telecommunications System (UMTS); LTE; Interworking between the Public Land Mobile Network (PLMN) supporting packet based services and Packet Data Networks (PDN)," 3GPP TS 29.061, Version 10.10.0, Release 10, ETSI TS 129 061 V10.10.0, Jul. 2013, (161 pages).
International Search Report dated Jan. 19, 2015 in PCT/EP14/73150 filed Oct. 28, 2014.

* cited by examiner

Mobility Scenario 1: UE involved in D2D communication
moves into coverage of another D2D group Mobility Scenario 2: UE involved in D2D communication
moves out of coverage of another D2D group

COMMUNICATIONS SYSTEM, COMMUNICATIONS DEVICE AND METHOD OF COMMUNICATING

CROSS-REFERENCE TO RELATED APPLICATIONS

The present application is based on PCT filing PCT/EP2014/073150 filed Oct. 28, 2014 and claims priority to European Patent Application 13 191 225.5, filed in the European Patent Office on Oct. 31, 2013, the entire contents of each of which being incorporated herein by reference.

FIELD OF THE DISCLOSURE

The present disclosure relates to communications systems, communications devices and methods of device-to-device communications.

BACKGROUND OF THE DISCLOSURE

Third as well as fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as video streaming and video conferencing on mobile communications devices that would previously only have been available via a fixed line data connection. The demand to deploy fourth generation networks is therefore strong and the coverage area of these networks, i.e. geographic locations where access to the networks is possible, is expected to increase rapidly.

The anticipated widespread deployment of fourth generation networks has led to the parallel development of a class of communications devices and applications which, rather than taking advantage of the high data rates available, instead take advantage of the robust radio interface and increasing ubiquity of the coverage area. One example of such an application is public safety communications, for instance communications between members of the emergency services. Public safety communications require a high degree of robustness and therefore fourth generation networks provide cost effective solution to public safety communications compared to dedicated systems such as TETRA which are currently used throughout the World. However, for public safety applications it is highly desirable that public safety communications devices can still communicate with each other even when outside of a coverage area provided by an LTE system. In LTE release-12 the ability for LTE devices to perform device-to-device communications has been introduced. This therefore allows LTE device to communicate with each other when outside of a coverage area but within close proximity of one another. This device-to-device communications ability allows LTE public safety communications even when there is no network coverage. However, the use of LTE for both high-reliability public safety communications and commercial applications may lead to complex resource allocation.

SUMMARY OF THE DISCLOSURE

According to an example embodiment of the present disclosure there is provided a communications system for device-to-device communications. The communications system comprises a group of a plurality of communications devices, each of the plurality of communications devices being configured to perform device-to-device communications via a wireless access interface with one or more other communications devices of the group. One of the communications devices of the group is configured to detect interference in communications resources of the wireless access interface caused by signals transmitted by another communications device, and to provide, in response to detecting the interference, an indication of the interference to one or more of the communications device of the group.

In one example the interference is caused by the other communications device transmitting signals on an uplink of the wireless access interface to an infrastructure equipment.

In another example the other communications device which is transmitting the interfering signals is a member of a second group of communications devices performing device to device communications. By arranging for one of the communications devices of the first group of communications devices to detect the interference and to communicate an indication of the interference to the other members of the first group, then members of the group can be arranged to adapt the transmission and reception of data via the wireless access interface to avoid resources of the wireless access interface which is subject to interference.

In one embodiment, one of the communications devices of the first group is configured to act as a first controlling entity operable to allocate resources of the wireless access interface to the communications devices of the first group for one or more of the communications devices of the first group to communicate with one or more of the communications devices of the first group. One of the communications devices of the second group is configured to act as a second controlling entity operable to allocate resources of the wireless access interface to the communications devices of the second group for one or more of the communications devices of the second group to communicate with one or more of the communications devices of the second group. A communications device of the first group is configured to detect interference in their allocated resources of the wireless access interface from device-to-device communications of the second group, and to provide, in response to detecting the interference, an indication of the interference to at least one of the first and second controlling entities.

In one example the interference is detected in an uplink of the wireless access interface.

In one example the indication of the interference is provided to the first controlling entity and the first controlling entity is configured, in response to receiving the indication, to reallocate resources of the wireless access interface to the communications devices of the first group in order to compensate for interference.

In one example the indication of the interference is provided to the second controlling entity and the second controlling entity is configured, in response to receiving the indication, to reallocate resources of the wireless access interface to the communications devices of the second group in order to compensate for the interference.

Providing an arrangement by which communications devices may indicate interference to a controlling entity, the controlling entity can be arranged to utilise the interference information in order to reconfigure resource allocations such that the effect of the interference is reduced and overlapping resources of the wireless access interface are not used by interfering groups of device-to-device communications devices.

In one example the indication of the interference is provided in response to the interference exceeding a predetermined threshold.

The use of a threshold reduces the possibility that resources are unnecessarily reallocated in scenarios were the interference is insufficient to affect the device-to-device communications within the groups of communications devices. Thus potentially reducing control overheads at the controlling entities.

In one example the resources allocated to the communications devices of the first and second groups are allocated from a predetermined set of resources.

The use of a predetermined set of resources limits the range of possible resource allocations and therefore may simplify the resource allocation and reallocation processes.

In one example the indication includes one or more of an amplitude of the interference, timing of the interference and synchronisation information.

The provision of such information provides the controlling entity with accurate information on the interference and therefore allows the controlling entity to accurately reallocate the resources of the wireless access interface and thus more effectively compensate for the interference.

Various further aspects and embodiments of the disclosure are provided in the appended claims, including but not limited to a communications device and a method of communicating

BRIEF DESCRIPTION OF THE DRAWINGS

Embodiments of the present disclosure will now be described by way of example only with reference to the accompanying drawing in which like parts are provided with corresponding reference numerals and in which.

DETAILED DESCRIPTION OF EXAMPLE EMBODIMENTS

Figure 1:
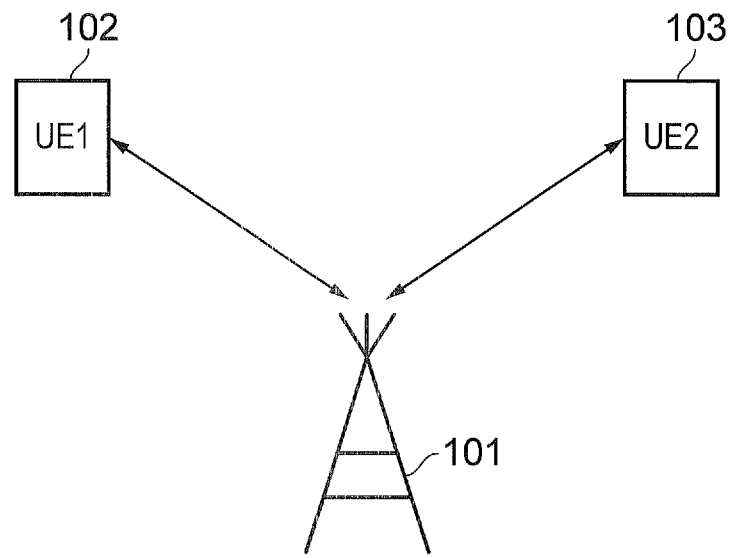
FIG. 1 provides a schematic diagram of a mobile communications system.

FIG. 1 provides an illustration of a conventional mobile or cellular communications network where network infrastructure equipment 101, such as an enhanced node B (eNodeB) in an 3GPP long term evolution (LTE) system, provides a wireless access interface to one or more mobile communications devices 102 103, which may also be referred to as user equipment (UE). Within a coverage area an eNodeB is configured to allocate uplink and downlink resources of a wireless access interface to the UEs such that they can communicate with each other via the eNodeB. These resources may be defined in terms of frequency and time and may also be time varying. The wireless access interface extends across a predetermined bandwidth, which for example in LTE systems is between 1.4 MHz and 20 MHz, and the wireless access interface in the case of LTE systems may be provided in the downlink by orthogonal frequency division multiplexing (OFDM) and in the uplink by single carrier frequency division multiple access (SC-FDMA). However, in other communications systems the bandwidth allocations and wireless access interface may differ.

Figure 2A:
FIGS. 2a and 2b provides schematic diagrams of device-to-device communications systems.

FIG. 2a illustrates a scenario where two UEs 201 and 202 may communicate with each other directly, i.e. without the need for infrastructure equipment. In LTE this technique is termed device-to-device (D2D) communications and was introduced into LTE release-12. As opposed to requiring an eNodeB to provide and allocate the resources of a wireless access interface, the UEs communicate directly with each other by negotiating access to a wireless access interface directly, although they are still also operable to communicate with infrastructure equipment. The wireless access interface may be provided in accordance with any of a number of techniques such as carrier sense multiple access (CSMA), OFDM or a combination thereof for example. Although in the foregoing description D2D communications are described with reference to an LTE system, the proposed techniques are equally applicable to other systems which are compatible with D2D communications.

D2D communications may use spectrum resources allocated to a network which the UEs are compliant with i.e. conventional LTE spectrum, or may use an independent licensed or unlicensed portion of spectrum. Advantageously, D2D communications devices may communicate with each other whilst not being within a coverage area of an eNodeB. Additionally, even if within the coverage area of an eNodeB the close proximity of the UEs may allow high data rate communications to be performed without the eNodeB taking part in the allocation of resources, thus freeing-up eNodeB resources. D2D communications may also provide benefits in terms of energy consumption at UEs. For example, if two UEs that wish to communicate with each other are in close proximity but in the outer regions of a coverage area, reduced power transmission may be required for D2D communication than for conventional communications via the serving eNodeB. Although in FIG. 2a only two UEs have been illustrated, any number of UEs may take part in D2D communications provided that they are within range of each other. A group of UEs that are within D2D communication range of each other may be referred to as a D2D group.

Figure 2B:
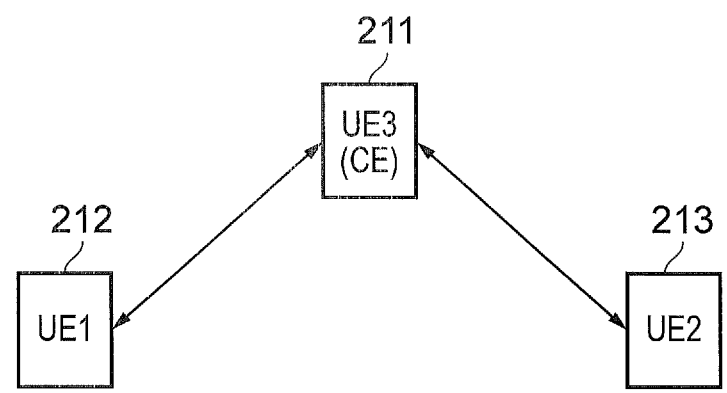

FIG. 2b illustrates an alternative D2D communications technique. In contrast to FIG. 2a, a UE 211 acting as a controlling entity (CE) is required to coordinate the communications between "slave" UEs 212 213 by allocating resources to the UEs which intend to communicate with each other, as well as in some examples acting as a relay between UEs which cannot communicate directly. The controlling entity may be one of the UEs intending to communicate, another UE from the D2D group or may be a specially adapted UE. The role of a controlling entity is to allocate resources, schedule communications between the UEs performing D2D communications and manage any interference that may be encountered. Accordingly, it is beneficial if the controlling entity is able to communicate with the maximum number of UEs. The controlling UE for a D2D group may change over time as UEs move and enter and exit a coverage area provided by a particular controlling entity or the controlling entity itself moves. For example, if a currently controlling entity moves such that a second UE becomes able to communicate with higher number of UEs by virtue of being in a more central geographic position relative to the other UEs, the role of controlling entity may be transferred to the second UE. A coverage area provided by a controlling entity may also define a D2D group, whereby UEs which can communicate with a particular controlling entity fall within a same D2D group. However, a D2D group may also be defined as UEs which are within a coverage area of a specified controlling node and which also wish to perform D2D communications.

D2D communications are anticipated to be used for a number of applications, which may include high data rate short-range communications and public safety or emergency communications where emergency personal communicate via the use of UEs. For example, if an emergency occurs in any area where there is no or limited network coverage or as a result of the emergency network coverage has been lost e.g. due to an earthquake, it is important that emergency personal maintain the ability to communicate with each other without the need for infrastructure equipment. Accordingly, in emergency scenarios it may be required that public safety D2D communications take priority over commercial communications.

UEs which are operable to perform D2D communications are also anticipated to be operable to communicate with conventional infrastructure equipment such as eNodeBs. Consequently, UEs in relatively close proximity may communicate via D2D communications when they are outside of a coverage area of an eNodeB and communicate via convention LTE communications when within the coverage area of an eNodeB. Although this dual communication ability provides increased robustness, this may lead to increased complexity wireless access interface resource allocation. As previously mentioned, the resources that UEs will use to perform D2D communications may vary. For instance in some examples they may utilise resources in unlicensed bandwidth such as the ISM 2.4 GHz band. However, in other examples the UEs will utilise resources in the bandwidth allocated to the LTE networks for D2D communications. Although the use of licenced bandwidth is likely to avoid a proportion of the interference that may be present in the ISM bands, the issue of how to allocate resources between conventional LTE communications and the D2D communications arises.

As described above, D2D communication may be utilised for public safety communications, which are high priority communications. Consequently, it is important that resources for D2D communications are available as and when required. A number of approaches to resource allocation are currently proposed depending on the position of UEs relative to eNodeB coverage. For example, a predetermined portion of the bandwidth/spectrum of the network which the UEs are members of may be reserved solely for D2D communications. This will therefore help ensure that whether UEs are outside or within a coverage area of an eNodeB there will be sufficient resources available for D2D communications. However, although this approach may increase the probability that resources will be available for D2D communications, this may lead to inefficient use of resources from a network operator perspective because the reserved resources will not be available to be used by the eNodeB when D2D communications are not taking place. A second approach is for an eNodeB to take part in the D2D resource allocation when D2D operable devices are in its coverage area such that any resource may be selected for D2D communications. However, this does not address the scenario where the UEs are outside of a coverage area. The first and second approaches may also be combined so that an eNodeB allocates resources to UEs for D2D communications from a predetermined set of resources and if a UE is not within a coverage area the UE selects resources from a predetermined set known to the eNodeB.

Device-to-Device Communications Usage Scenarios

As a result of the communication techniques (D2D and conventional cellular communications) in the LTE system described above, a number of different coverage scenarios may occur, each of which may impact on the choice of resource allocation procedure. Furthermore, in some scenarios the resource allocation techniques described above may not be sufficiently flexible to balance the requirements of D2D devices, and particularly public safety D2D devices, against the commercial interests of the network operators which support the D2D UEs.

FIGS. 3a to 3d provide illustrations of scenarios that may occur in LTE D2D communications and the impact that the various scenarios may have on resource allocation.

Figure 3A:
FIGS. 3a to 3d provides schematic diagrams of coverage scenarios in device-to-device communications systems.

FIG. 3a illustrates the scenario where two UEs 301 302 are not within the coverage area of an eNodeB and are communicating via D2D communications. Due to lack of eNodeB coverage the network is unlikely to be able to take an active part in any resource allocation procedure. Additionally, because the UEs are not in a coverage area, the use of network resources (i.e. a portion of network bandwidth) for D2D communication is unlikely to impact upon the capacity of the network.

Figure 3B:
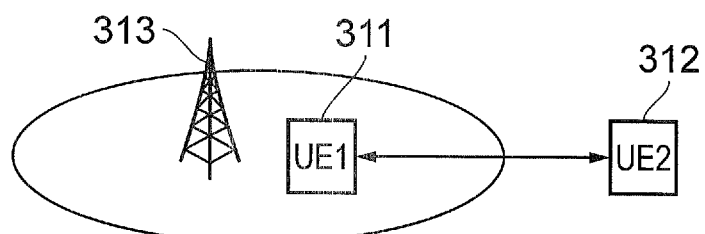

FIG. 3b illustrates the scenarios when one of two UEs 311 312 which are performing D2D communications is within the coverage area of an eNodeB 313. Consequently, the UE within the coverage area may communicate with the eNodeB and communicate with the second UE via a wireless access interface adapted for D2D communications. Due to the ability of one of the UEs to communicate with the eNodeB the network may take an active role in determining the resources allocated for D2D communications between the UEs and the resources used for D2D communication may impact upon resource allocation at the eNodeB.

Figure 3C:
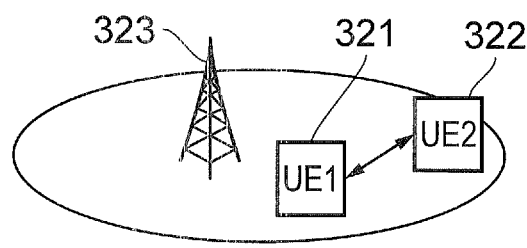

FIG. 3c illustrates the scenario where UEs 321 322 are performing D2D communications and they are both within the coverage area of the same eNodeB 323 such that the UEs may communicate with each other via the eNodeB or via D2D communications. As for FIG. 3b, the eNodeB is therefore able take an active role in the allocation of resources for the D2D communications and the resources used for D2D communication may impact upon resource allocation at the eNodeB.

Figure 3D:
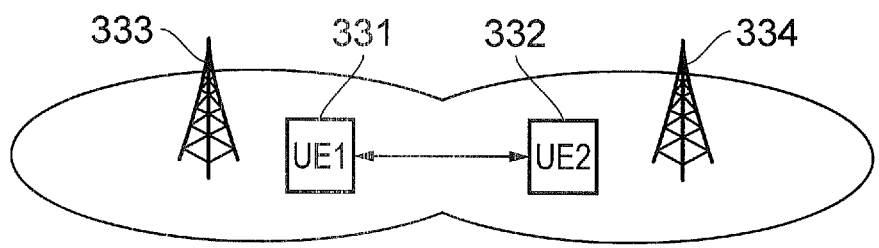

FIG. 3d illustrates the scenario where the UEs 331 332 performing D2D communications are each within the coverage area of a different eNodeB. The first UE 331 is operable to communicate with both the second UE 332 and a first eNodeB 333 and the second UE 332 is operable to communicate with both the first UE 331 and the second eNodeB 334. Consequently, the UEs may communicate with each other either via the eNodeBs or via D2D communications. When D2D communications are chosen the network may once again take part in the resource allocation because at least one UE is within the coverage area of an eNodeB and the resources used for D2D communication may impact upon resource allocation at either of the eNodeBs.

In the scenarios of FIGS. 3b to 3d, the network may take an active role in D2D resource allocation because least one of D2D UEs are within the coverage area of an eNodeB. Furthermore D2D communications may impact upon network allocation at the eNodeB because they are within the eNodeB coverage area. In the scenario of FIG. 3a the resources used for D2D communications will not impact upon non-D2D resources because the D2D communications are taking place outside of network coverage. However, if D2D resource allocation initially takes place in a scenario as depicted in FIG. 3a but the UEs move such that a scenario as depicted in any of FIGS. 3b to 3d occurs, resource allocation problems may occur because the initial resource allocation has not taken into account the presence of an eNodeB. This scenario is depicted in FIG. 4.

Figure 4:
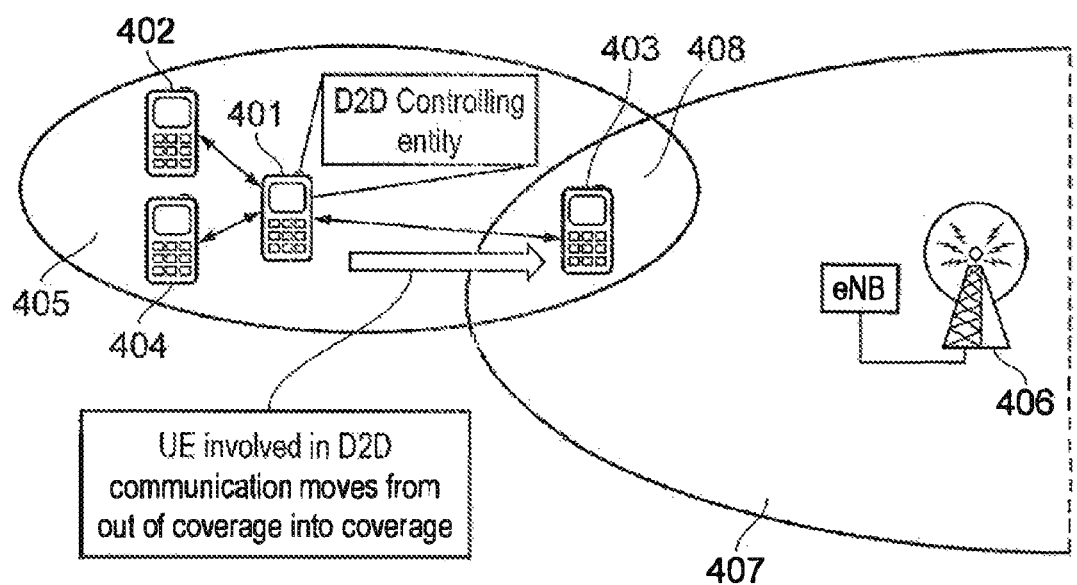
FIG. 4 provides a schematic diagram of a coverage scenario in a device-to-device communications system.

In FIG. 4 a D2D communication group is formed from a plurality of UEs 401 to 404 where UE 401 is the controlling entity, or a transmitting UE if a controlling entity is not present and direct D2D communications are taking place, and provides a coverage area 405 for the D2D communication group. The eNodeB 406 provides a network coverage area 407 in which UEs may perform conventional LTE communications with the eNodeB. As shown in FIG. 4, UE 403 may move into the interference region 408 from outside the coverage area 407 whilst maintaining its membership of the D2D communication group. Consequently, if the resources utilised by the D2D group and the eNodeB overlap, there may be increased interference and potential failure in D2D communication and/or the eNodeB communications, which in the case of public safety applications is unacceptable.

Figure 5:
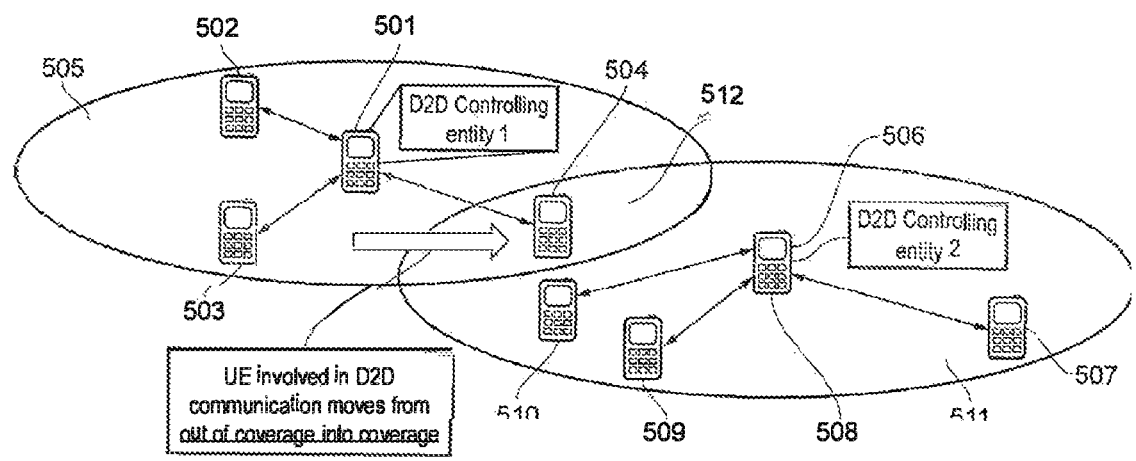
FIG. 5 provides a schematic diagram of a coverage scenario in a device-to-device communications system.

A similar situation may also occur when two D2D groups of UEs move with one another's coverage areas. This scenario is depicted in FIG. 5. A first group of UEs 501 to 504 are within the D2D coverage area 505 provided by a first controlling entity UE 501, or a transmitting UE if a controlling entity is not present. A second group of UEs 506 to 510 are within the D2D coverage area 511 provided by a second controlling entity UE 506. Initially these the coverage areas of the first and second groups do not overlap and the D2D communications within each group are unlikely to interfere with each other. However, as shown in FIG. 5, if a member of the first group moves into the coverage area of the second group (i.e. the interference region 512) and the wireless resources of the two groups overlap, increased interference will be experienced in the wireless access interface by both the first and second groups. This may lead to degraded perform and potential failure in D2D communications, which for public safety applications is once again unacceptable. In order to reduce the possibility of increased interference and D2D communication failure, a mechanism by which the problem of overlapping resources can be resolved would be beneficial.

Device-to-Device Communications Resource Allocation

Figure 6:
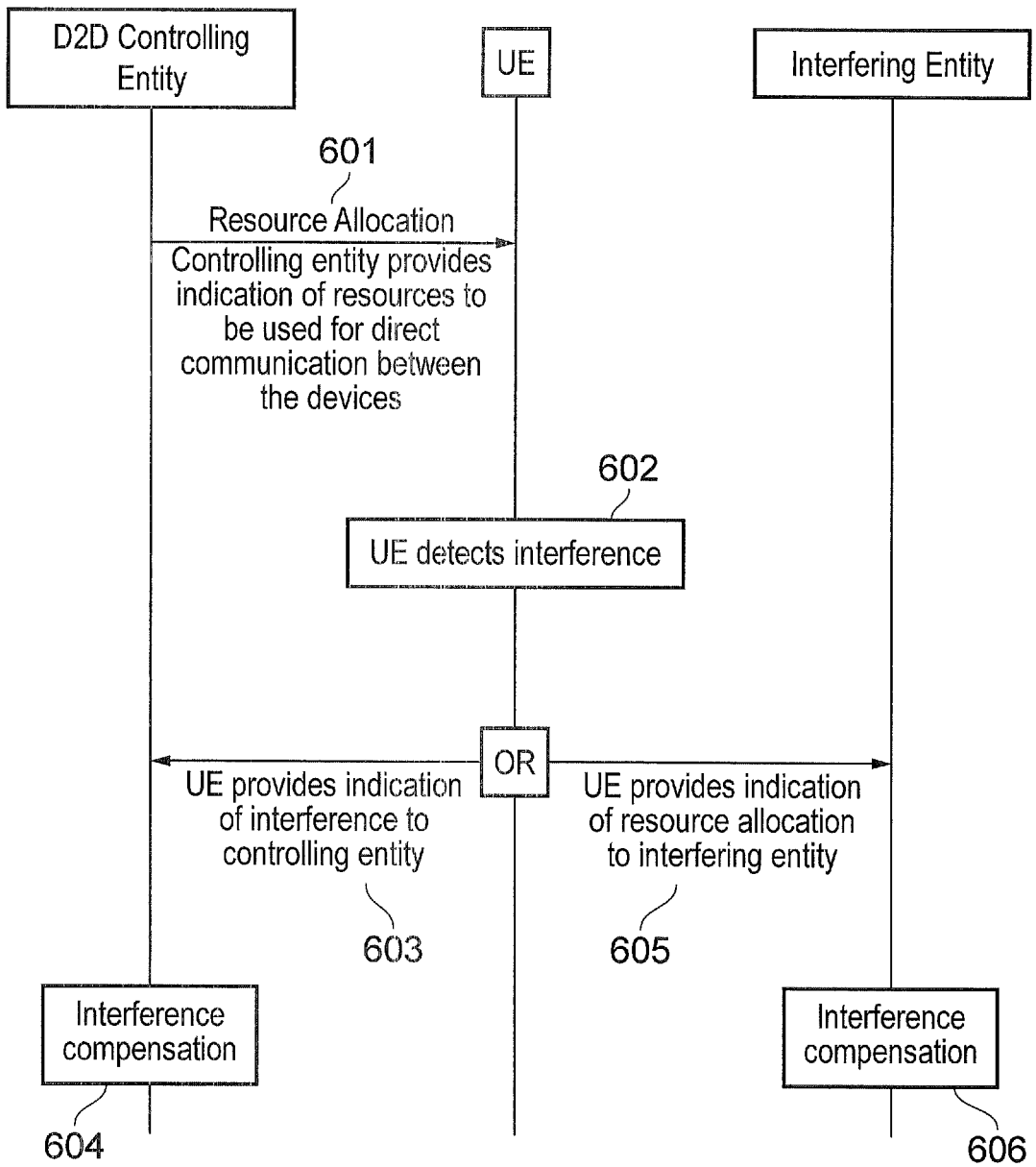
FIG. 6 provides a flow diagram of an interference mitigation technique in a device-to-device communications system.

FIG. 6 provides a flow diagram of generalised approach to addressing the problems of resource overlap described above. Initially a resource allocation message 601 is provided to the UE by its controlling entity (if one is present) where the message 601 indicates the resources that the UEs are to use for D2D communications. If a controlling entity is not present a UE may just start transmitting in resources if the resources are determined to be free from a carrier sense operation. Accordingly, a receiving UE will detect such a transmission are proceed to receive it. Whilst D2D communications are being performed by the UEs, each UE monitors its allocated resources for interference. Once interference is detected from an interfering entity such as a neighbouring D2D group or an eNodeB at 602, the UE is required to compensate/avoid the interference. The UE has one of two options on how to compensate for the interference. As will described in more detail below, depending on the origin of the interference, the UE may provide an indication 603 of the interference to the controlling entity or an indication 605 of the interference or resource being used to the interfering entity. The entity which receives the indication will then take action to compensate for the interference 604 606. If the UEs are performing direct D2D communications without the use of a controlling entity the UE which detects the interference may provide some form of feedback to the transmitting UE which provides an indication of the interference. It would then be the responsibility of the transmitting UE to take action to avoid or compensate for the interference. In the following examples, a D2D group with a controlling entity is presumed, however the techniques are equally applicable to direct D2D communications between UEs.

Figure 7:
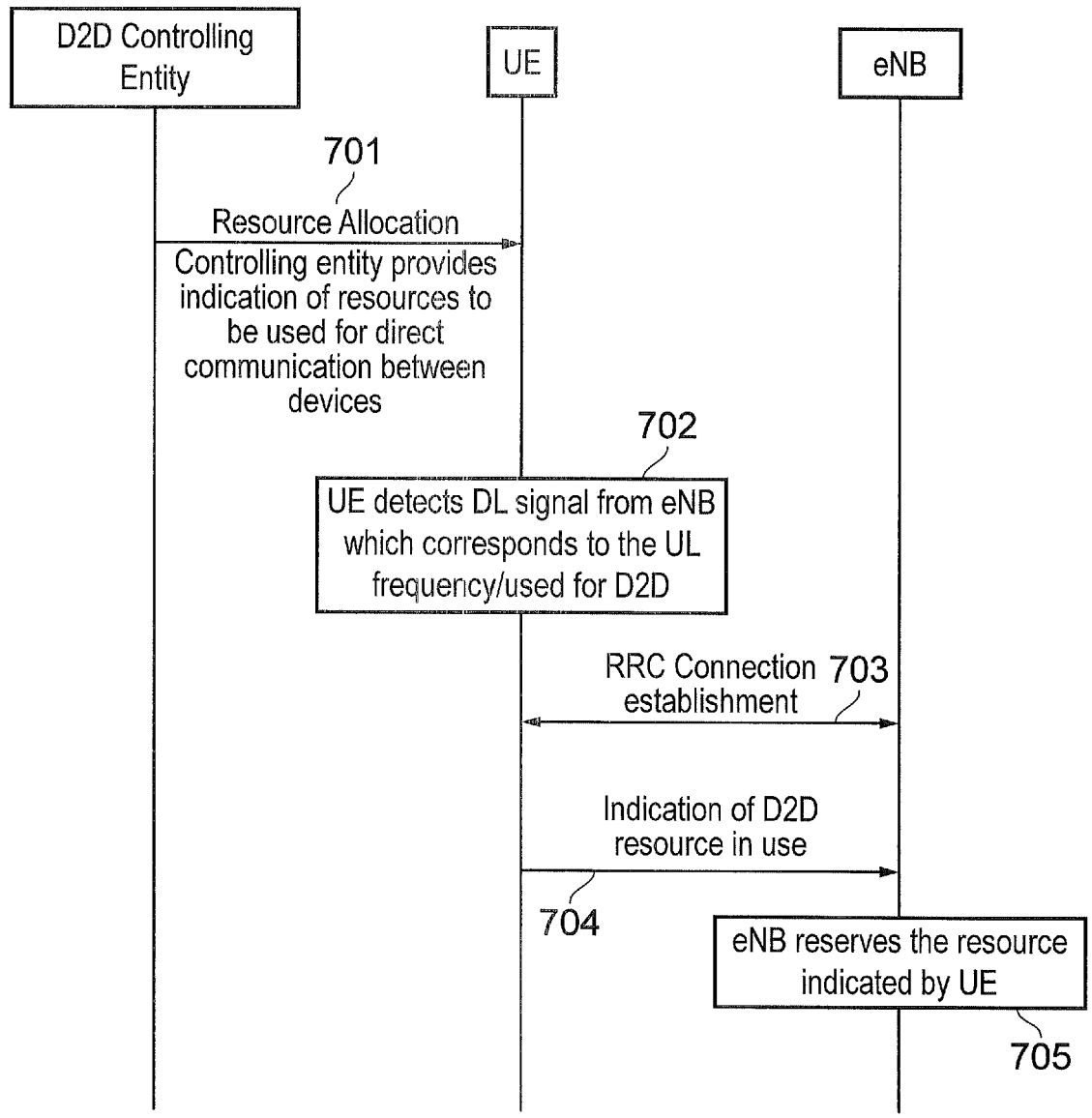
FIG. 7 provides a flow diagram of an interference mitigation technique in a device-to-device communications system.

FIG. 7 provides a flow diagram of an approach which is in accordance with an example of the present disclosure where the source of the interference detected at the UE is an eNodeB. As described with reference to FIG. 6, the UE initially receives a resource allocation 701 from the controlling entity of its D2D group. Once this has been received and D2D communications commenced, the UE sets up a measurement event and monitors its allocated resources for interference. Interference monitoring may take place with respect to all or part of the resources which have been allocated to the UE. For example, in FIG. 7 the UE monitors for downlink signals from an eNodeB which correspond to its allocated uplink resources. If the downlink signals which correspond to such uplink resources have been detected 702, the UE attempts to establish an RRC connection 703 with the eNodeB. Upon establishment of an RRC connection the resources currently being used by the D2D group, and therefore the interference caused by the eNodeB, are indicated to the eNodeB via a measurement report message for example 704. As an alternative to a measurement report message or other uplink message, the indication may also be communicated via an RRC connection request or another initial uplink message sent on an uplink channel, such as the random access channel (RACH) for example in order to avoid a connection setup delay. Upon receipt of the indication the eNodeB has a number of options of how to compensate for the interference. A first approach is illustrated in FIG. 7, where the eNodeB may cease using the resources which the D2D group is using and reserve these resources 705 until they are no longer required by the D2D group. This approach may be suitable for public safety D2D communications because it does not involve the D2D group switching resources and it also ensure that the interfering eNodeB will not interfere in the near future because the resources are reserved. In order for resources to be reserved correctly, further procedures such as synchronisation between the D2D group and the eNodeB may be necessary. For example, timing and frequency synchronisation between the eNodeB and the D2D group may be required.

Although the approach illustrated in FIG. 7 and described above provide a robust approach to allow a D2D to continue using a same set of resources, a number of potential issues may arise. Firstly, because resources are allocated solely to D2D communications the capacity of the network is adversely affected. Consequently, it would be beneficial from a network operator point of view that resources are reserved for a finite period of time but whilst allocation the reservation to be renewed by the D2D group if the resources are sill required upon expiry of the time period. In combination with expiry period it may also be advantageous for a UE to inform an eNodeB when the resources allocated for D2D communications are no longer required. For instance this may occur when D2D communications have finished. Secondly, it may not be desirably from a network operator point of view that UEs are able to exercise control over resource allocation and therefore an eNodeB. This effect is lessened if resource allocation is only permitted for public safety application because situations where public safety emergencies arise and network coverage is unavailable are hoped to be relatively rare. To prevent UEs exercising undesirably levels of control of eNodeBs, it is envisaged that only authentic public safety UEs are able to initiate resource reservation at the eNodeB. Accordingly, some form of authentication may be required such as a security token or other information that may be used to verify that the UE is an authentic public safety device.

The measurement event setup within the UE to detect interference may either be created internally at the UE or potentially configured by the UE's controlling entity such that all UEs within a D2D group apply the same interference detection criteria. In terms of interference detection criteria there may be an interference level threshold or power level threshold which is required to be exceeded before a measurement event is reported. This would therefore allow UEs which are within a coverage area of an eNodeB but which do not experience problematic interference to avoid requesting resource reservation. The measurement of interference from eNodeB may be measured via measurement of the reference signal received power (RSRP) or reference signal received quality (RSRQ) of the downlink eNodeB signal or the RSRQ of the D2D communication signal. In order to reduce the quantity of data transmitted to the eNodeB indicating the resources used by D2D communications, the UE may provide a resource index which indicates which out of a predetermined range of resources the D2D group is currently using.

Figure 8:
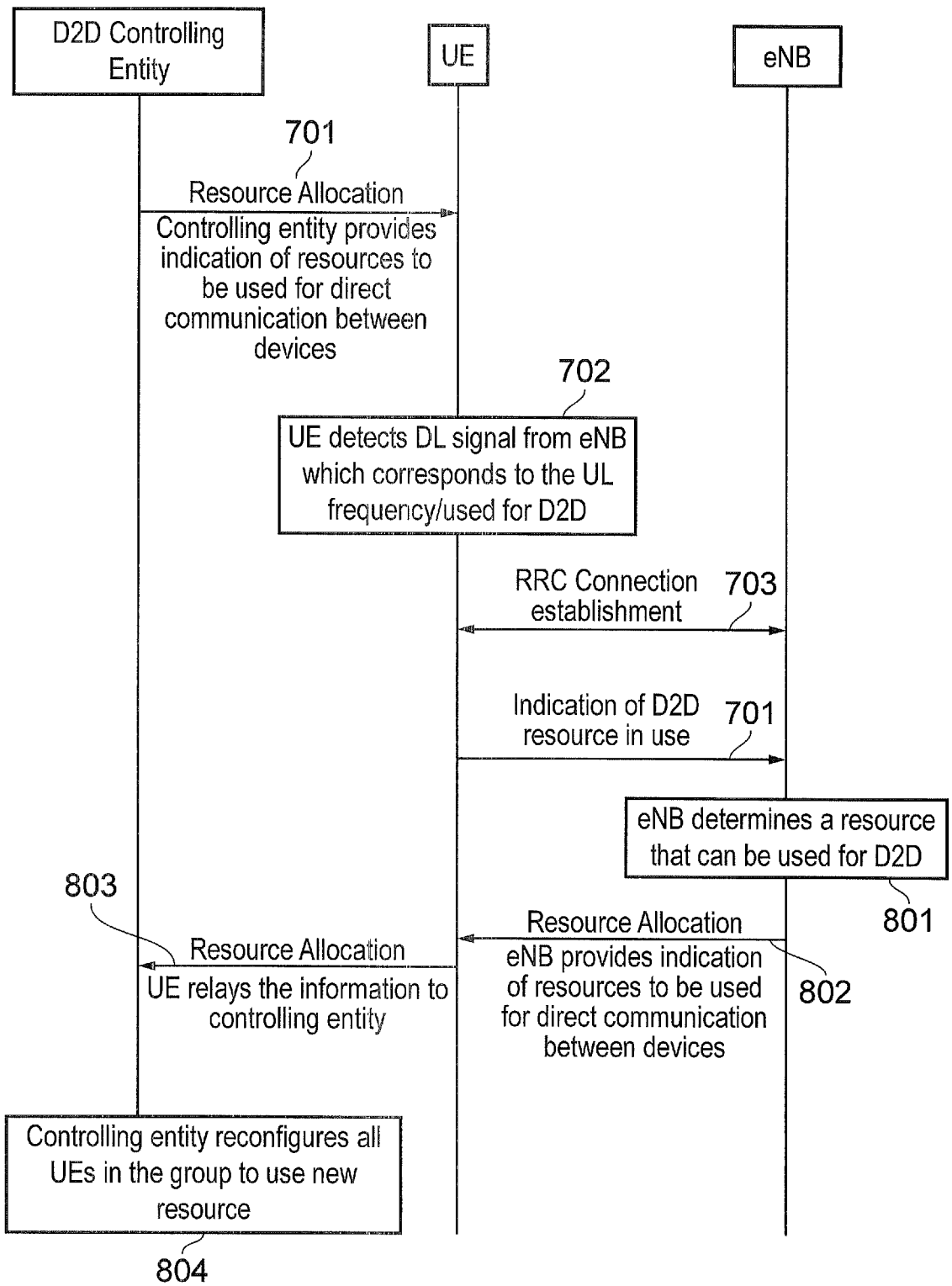
FIG. 8 provides a flow diagram of an interference mitigation technique in a device-to-device communications system.

FIG. 8 provides a flow diagram of an approach in accordance with an example of the present disclosure where the source of the interference detected at the UE is an eNodeB. The initial steps in the procedure are equivalent to those described above with reference to FIG. 7, however, the action that the eNodeB takes to compensate for the interference differs. Instead of reserving the resources which the D2D group is currently using and which have been indicated to the eNodeB, it is instead the eNodeB that determines a set of resources which can be used 801 by the D2D group and provides the UE with an indication 802 of this revised allocation. The UE will then be required to relay the indication 803 of the revised resource allocation to the controlling entity or transmitting UE so that the controlling entity or transmitting UE can configure the D2D group to use the newly allocated resources 804. Depending on the control structure of the D2D group, the reconfiguration of the resource allocation within the D2D group may take a number of forms. For example a new control channel may be established in the newly allocated resources and UEs directed to this channel. Alternatively, an RRC reconfiguration command may be sent or a broadcast channel set up by the controlling entity may be used to inform all UEs within the D2D group of a change in resources, or the transmitting UE may simply start to transmit on a new resource requiring that receiving UEs reconfigure to this resource. Such reconfiguration data may also include synchronisation information in order to synchronise the group with the eNodeB such that the resources are accurately allocated and interface due to poor synchronisation reduced. Although the approach illustrated in FIG. 8 transfer control of resource allocation to an interfering eNodeB, the D2D communications for public safety applications will still have priority over commercial communications. The resources allocated for D2D may be defined in terms of allocated bandwidth, time slots or a combination of both bandwidth and time slots.

Figure 9:
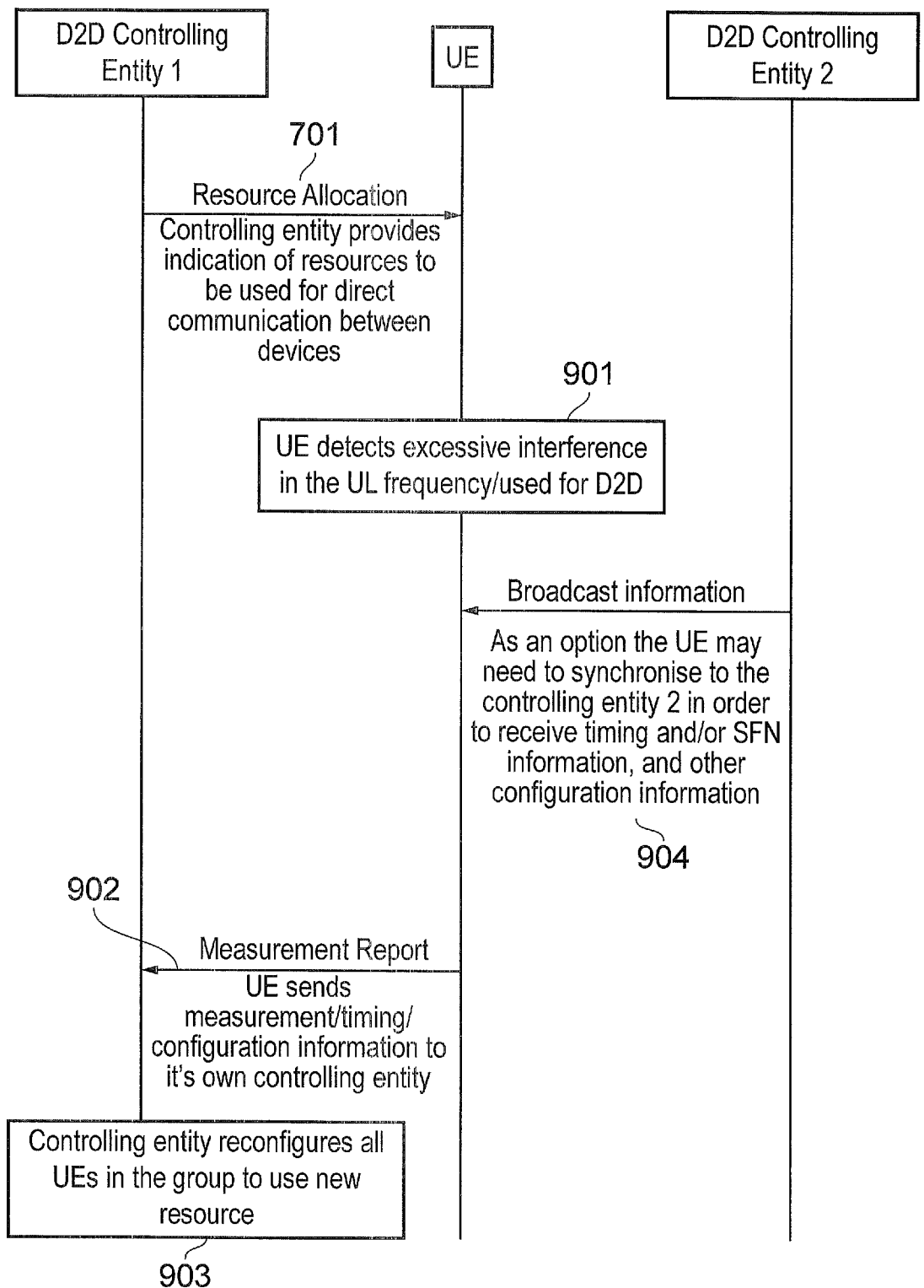
FIG. 9 provides a flow diagram of an interference mitigation technique in a device-to-device communications system.

FIG. 9 provides a flow diagram of an approach in accordance with an example of the present disclosure where the source of the interference detected at the UE is a neighbouring D2D group or an uplink signal from a UE communicating with an eNB. As described with reference to FIG. 6, the UE initially receives an indication of a resource allocation 701 from the controlling entity of its D2D group. Once this has been received and D2D communications commenced the UE sets up a measurement event and monitors its allocated resource for interference. Interference monitoring may take place with respect to all or part of the resources which have been allocated to the UE but is most likely to be respect to the resources allocated for uplink D2D transmissions by the UE. This measurement event may be configured in a similar manner to that described with reference to FIGS. 7 and 8 but is not directed solely to downlink signals from an eNodeB. Once a measurement event has been detected 901 there are a number of approaches which may be taken to compensate for the interference. A first approach is the UE provides an indication of the interference to the its controlling entity as measurement report 902, where the indication may include interference power, frequency and the like. The controlling entity or transmitting UE may then reconfigure the resources 903 which are utilised by the D2D group such that the interference is substantially avoided. The reconfigured resources may be selected from a predetermined set of D2D resources or from the entire range of resources which the D2D group is operable to operate over. An alternative and potentially more sophisticated approach is for the UE, once a measurement event has been detected at the UE, to establish the source of the interference and in particular whether its origin is a second D2D group. This is achieved by monitoring the resources upon which the interference was detected for a broadcast signal 904 from a second D2D group. Each D2D group and in particular each controlling entity of a D2D group may be configured to provide broadcast information in a broadcast signal so that UE can join the D2D group. This broadcast information may include synchronisation and timing information and other configuration information required to establish a connection with the controlling entity. All or part of this broadcast information may then be included in the indication 902 provided to the controlling entity by the UE. With this information the controlling entity may then either adapt the use of the current resources to substantially avoid the interference or reconfigure the resource allocation 903 as described above for the first approach.

Figure 10:
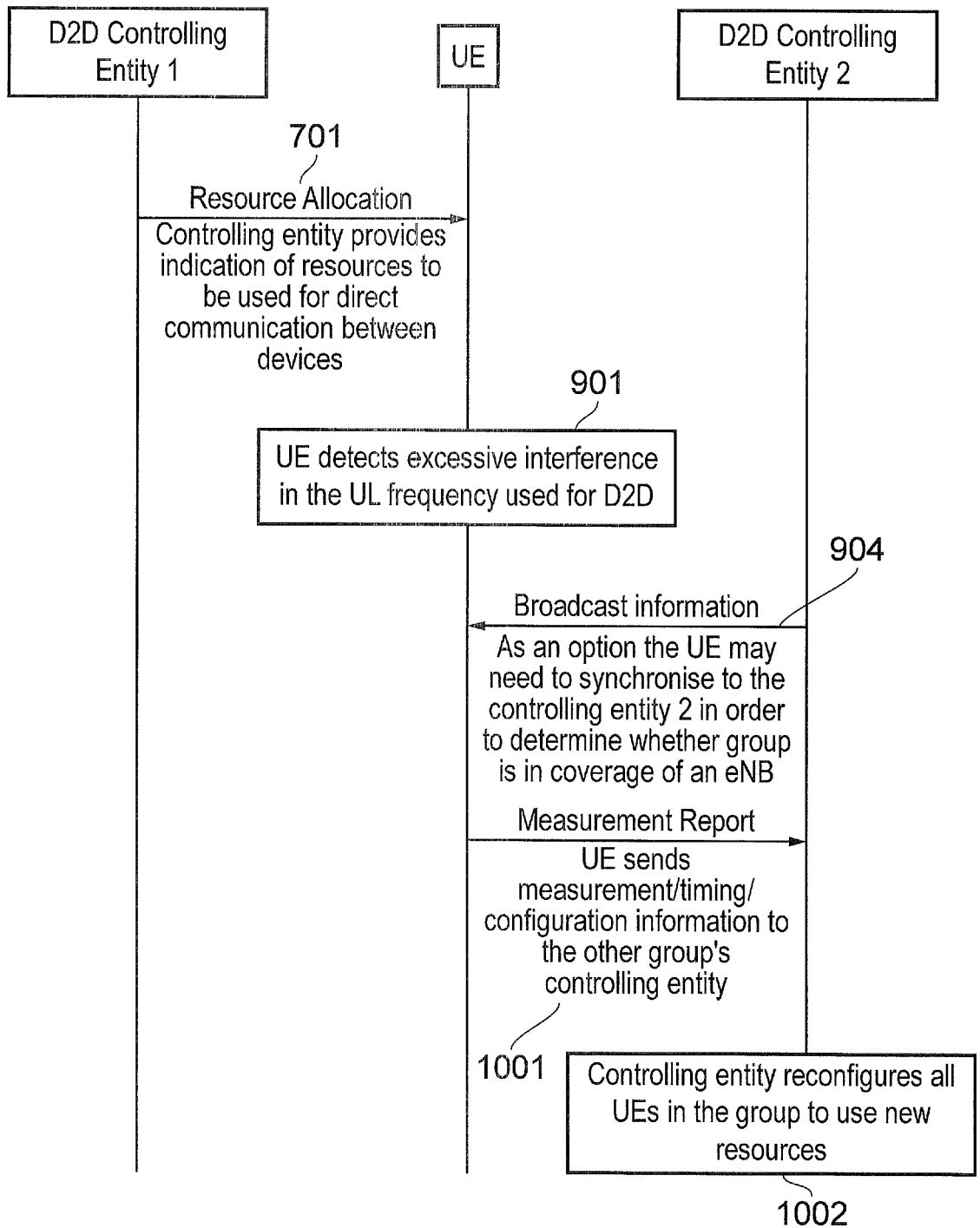
FIG. 10 provides a flow diagram of an interference mitigation technique in a device-to-device communications system.

FIG. 10 provides a flow diagram of an approach in accordance with an example of the present disclosure where the source of the interference detected at the UE is a neighbouring or second D2D group and either the first D2D group or both D2D groups are within the coverage area of an eNodeB. As described with reference to FIG. 7, the UE initially receives an indication of a resource allocation 701 from the controlling entity of its D2D group. Once this has been received and D2D communications commenced the UE sets up a measurement event and monitors its allocated resource for interference. Interference monitoring may take place with respect to all or part of the resources which have been allocated to the UE but is most likely to be respect to the resources allocated for uplink D2D transmissions by the UE. This measurement event may be configured in a similar manner to that described with reference to FIGS. 7 and 8 but is not directed solely to downlink signals from an eNodeB. Once excessive interference has been detected 901 and a measurement event occurred the UE establishes whether the interference results from a neighbouring or second D2D group. If so, the UE may then attempt to receive broadcast information 904 transmitted by the controlling entity of the neighbouring or second D2D group in order to establish whether the second D2D group is within the coverage area of an eNodeB. If the second D2D group is out of coverage but the first D2D group is within a coverage area then the UE is configured to send an indication of the interference 1001 to the controlling entity of the second D2D group so that the resources of the second D2D network can be reconfigured 1002 such that interference between the two D2D groups is reduced. This approach allows independent D2D resource allocations to be reconfigured before it is required to reconfigure eNodeB allocations and therefore prevents UEs from determining resource allocations at an eNodeB. Although in FIG. 10 an indication of interference i.e. a measurement report has been sent to the controlling entity of the second D2D group, if both the first and second D2D groups are within a coverage area of an eNodeB a measurement report may be sent to both controlling entities such that both resource allocations are reconfigured. Alternatively, the measurement reports may be relayed back to the eNodeBs which provide the coverage for the first and second D2D groups such that the reconfiguration of resources can be negotiated between the eNodeBs via a backhaul link or the controlling entities and the eNodeBs.

Although the approaches described with reference to FIGS. 6 to 10 have been applied to D2D groups where a controlling entity configures and coordinates communications within the group the above described approaches may also be applied to direct D2D communications without a controlling entity as illustrated in FIG. 2*a*. In cases where there is no controlling entity, each UE may internally setup a measurement event which monitors interference on the resources used for D2D communications. If interference is detected, the UE which performed the detection may then become responsible for reconfiguring the allocation of resources such that the interference is avoided or may report the interference to the transmitting UE which would then reconfigure the resources being used for transmission. This situation may occur for example where the interference originates from an eNodeB or a neighbouring D2D group to which the UE is unable to establish communications with therefore unable to request that their resource allocation is reconfigured. Furthermore, even though the measurement event have been described as applying to only a single type of interference i.e. either D2D interference or eNodeB interference, each UE in a D2D group may monitor its resources for any type of excessive interference. For instance, a UE may detect interference from a device which is neither a D2D device or an eNodeB but is instead for example a conventional UE which is communicating with an eNodeB, or another interfering device entirely. In such a scenario the controlling entity of the UE or the currently transmitting UE may be informed of the interference and resource allocations reconfigured to avoid the interference.

De-centralised Resource Allocation

Figure 11:
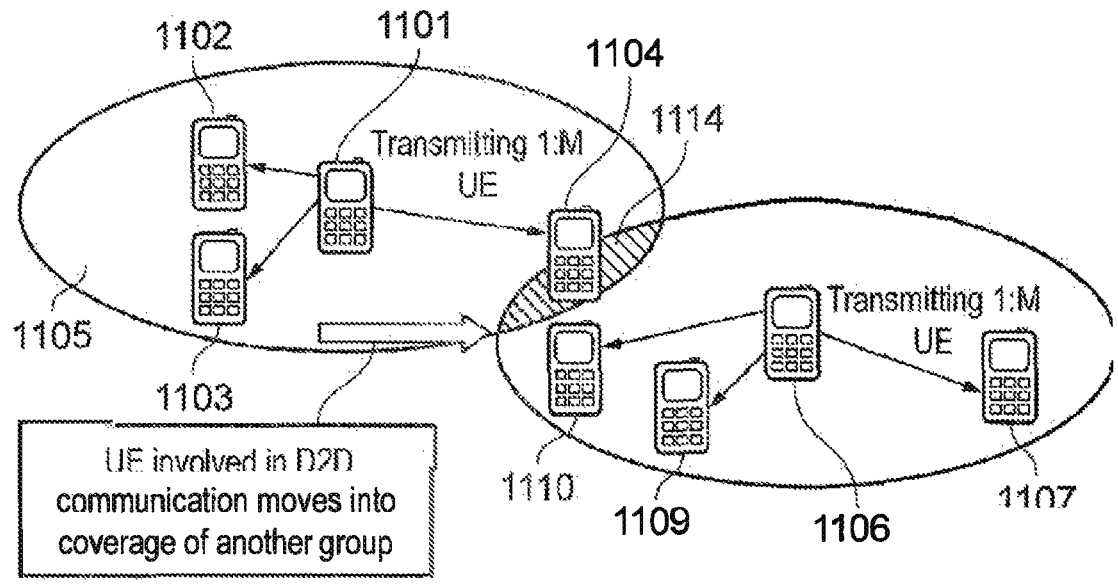
FIG. 11 provides a schematic diagram of a coverage scenario in a device-to-device communications system.
Figure 12:
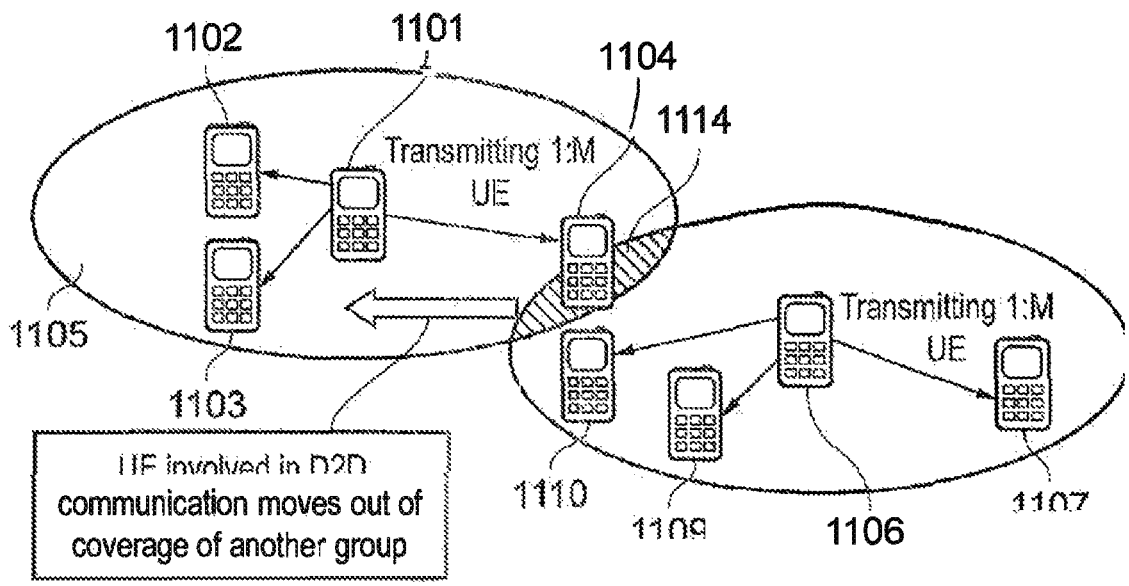
FIG. 12 provides a schematic diagram of a coverage scenario in a device-to-device communications system.

A particular issue is as shown in FIGS. 11 and 12 showing different scenarios. FIG. 11 provides an example in which a UE 1104 from a first group of UE's 1101, 1102, 1103, 1104 experiences interference as a result of a UE 1104 from that group moving into an interference coverage area 1114 of transmissions of a second group of UE's 1106, 1107, 1109, 1110. Correspondingly FIG. 12 provides an example in which the new EE 1104 moves out of coverage area the interference region 1104 from the second group of unions.

If the controlling and/or transmitting UEs from two separate groups are unable to detect the signal from one another, or from UEs transmitting to an eNB, then a CSMA based or co-ordinated approach will not improve the situation for a receiving UE which is receiving signals from both transmitting UEs without some form of feedback from a potential receiving UE. This can also be the case even when the UEs are stationary.

According to the example embodiment shown in FIGS. 11 and 12 there is no controlling entity provided in the respective groups of UEs. According to the example shown in FIGS. 11 and 12 one of the UEs in each group performs a carrier sensing operation to detect interference from transmissions from one or more UEs in the other group. Having detected the interference, the UE transmits an indication of the interference to other members of the same group or the members of the other group of UEs and accordingly directs the transmitting UE to avoid the communications channel on which interference is caused by transmissions from the other group. FIG. 11 provides an example scenario which as a result of mobility one of the UEs from the first group moves into coverage area provided by the second group. In the example in FIG. 12 one of UEs from the group which is interfering with the second group moves out of the coverage area of the second group.

The transmitting UE needs to take into consideration whether or not the receiving UEs are able to listen on the resource as well as whether the transmitting UE can detect any possible interference. The actual method of taking this information into account when allocating resources at the transmitting UE will depend on the general approach taken.

If a control plane connection exists between a controlling entity and other UEs then this could be used to convey measurement reports either to a transmitting UE from a receiving UE or via a controlling entity.

A purely broadcast approach may need to reserve specific resources to allow UEs to send control information, or prioritise attempts to transmit control information over data transmissions.

According to this example the listener UE needs to be able to inform the transmitting UE if it enters the coverage of a transmitting UE from another D2D group/session or into the coverage of an eNB. The method of reporting will depend on the resource allocation method chosen and should be taken into account when selecting the solution.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

The invention claimed is:

1. A communications system for device-to-device (D2D) communications, the communications system comprising:

a first group of a first plurality of communications devices that are each configured to perform D2D communications via a wireless access interface with one or more other communications devices of the first group, a communications device of the first plurality of communications devices of the first group is configured to:
  detect interference in communications resources of the wireless access interface caused by signals transmitted by another communications device included in a second group of a second plurality of communications devices configured to perform D2D communications via the wireless access interface with one or more other communications devices of the second group; and
  provide, in response to detecting the interference, an indication of the interference to a controlling entity of the first group that is another communications device of the first group other than the communications device, wherein
  in response to the indication of the interference, the controlling entity reconfigures an allocation of the communications resources for the D2D communications performed by the first group, and notifies at least one of the communications devices of the first group of the of the reconfigured allocation, and
  in response the reconfigured allocation, the at least one of the communications devices uses the reconfigured allocation of the communications resources for the D2D communications to avoid interference with the signals transmitted by the another communications device.

2. The communications system as claimed in claim 1, wherein the interference is detected in an uplink channel of the wireless access interface.

3. The communications system as claimed in claim 1, wherein
  the controlling entity is a different one of the communications devices of the first group, and
  the controlling entity allocates the resource of the wireless access interface to the first group of communications devices.

4. The communications system as claimed in claim 1, wherein
  one of the communications devices of the second group operates as a second controlling entity for allocating the resource of the wireless access interface to the second group of communications devices,
  the indication of the interference is provided to the second controlling entity, and
  the second controlling entity is configured, in response to receiving the indication, to reconfigure a second allocation of communications resources of the wireless access interface to the communications devices of the second group in order to compensate for the interference.

5. The communications system as claimed in claim 1, wherein the indication of the interference is provided in response to the interference exceeding a predetermined threshold.

6. The communications system as claimed in claim 1, wherein the indication includes one or more of an amplitude of the interference, timing of the interference and synchronisation information.

7. The communications system as claimed in claim 1, wherein the system further comprises a network infrastructure equipment configured to communicate with one or more of the communications devices of the second group, and
the network infrastructure equipment is configured to provide the indication to a second controlling entity that is for allocating the resource of the wireless access interface to the second group.

8. A communications device for device-to-device (D2D) communications, the communications device being configured to perform D2D communications via a wireless access interface with one or more other communications devices of a first group of a first plurality of communications devices, the communications device being a member of the first group but not a controlling entity for granting resource allocation for other communication devices of the first group, and the first group including at least one other communications device configured to transmit data via the wireless access interface to one or more of the communications devices of the first group, the communications device comprising:
  a transmitter configured to transmit data to one of more of the communications devices of the first group;
  a receiver configured to receive data from one of more of the communications devices of the first group; and
  a controller configured in combination with the transmitter and the receiver to:
    detect interference in communications resources of the wireless access interface caused by signals transmitted by another communications device included in a second group of a second plurality of communications devices configured to perform D2D communications via the wireless access interface with one or more other communications devices of the second group; and
    provide, in response to detecting the interference, an indication of the interference to the controlling entity of the first group, wherein
  in response to the indication of the interference, the controlling entity reconfigures an allocation of the communications resources for the D2D communications performed by the first group, and notifies at least one of the communications devices of the first group of the of the reconfigured allocation, and
  in response to the reconfigured allocation, the at least one of the communications devices uses the reconfigured allocation of the communications resources for the D2D communications to avoid interference with the signals transmitted by the another communications device.

9. A communications device for device-to-device (D2D) communications, the communications device being configured to perform D2D communications via a wireless access interface with one or more other communications devices of a first group of a first plurality of communications devices, the communications device being a member of the first group but not a controlling entity for granting resource allocation for other communication devices of the first group, and the communications device comprising:
  a transmitter configured to transmit data to one of more of the communications devices of the first group;
  a receiver configured to receive data from one of more of the communications devices of the first group; and
  a controller configured in combination with the transmitter and the receiver to:
    receive an indication, from the controlling entity, of a reconfigured allocation of communications resources for the D2D communications performed by the first group, the controlling entity having reconfigured an allocation of the communications resources based on an indication of interference in the communications resources and the interference being caused by signals transmitted by another communications device included in a second group of a second plurality of communications devices configured to perform D2D communications via the wireless access interface with one or more other communications devices of the second group; and transmit, in response to receiving the indication of the reconfigured allocation, the data on resources according to the reconfigured allocation to avoid interference with the signals transmitted by the another communications device.

10. Circuitry for device-to-device (D2D) communications, the circuitry being configured to perform D2D communications via a wireless access interface with one or more other communications devices of a first group of a first plurality of communications devices, the circuitry being for a communications device that is a member of the first group but is not a controlling entity for granting resource allocation for other communication devices of the first group, the circuitry being a member of the first group, and the first group including at least one other communications device configured to transmit data via the wireless access interface to one or more of the communications devices of the first group, the circuitry comprising:

transmitter circuitry configured to transmit data to one of more of the communications devices of the first group;

receiver circuitry configured to receive data from one of more of the communications devices of the first group; and controller circuitry configured in combination with the transmitter and the receiver to:

detect interference in communications resources of the wireless access interface caused by signals transmitted by another communications device included in a second group of a second plurality of communications devices configured to perform D2D communications via the wireless access interface with one or more other communications devices of the second group; and provide, in response to detecting the interference, an indication of the interference to the controlling entity of the first group, wherein in response to the indication of the interference, the controlling entity reconfigures an allocation of the communications resources for the D2D communications performed by the first group, and notifies at least one of the communications devices of the first group of the of the reconfigured allocation, and in response the reconfigured allocation, the at least one of the communications devices uses the reconfigured allocation of the communications resources for the D2D communications to avoid interference with the signals transmitted by the another communications device.

11. Circuitry for device-to-device (D2D) communications, the circuitry being configured to perform D2D communications via a wireless access interface with one or more other communications devices of a first group of a first plurality of communications devices, the circuitry being a member of the first group but not a controlling entity for granting resource allocation for other communication devices of the first group, the circuitry comprising:

transmitter circuitry configured to transmit data to one of more of the communications devices of the first group;

receiver circuitry configured to receive data from one of more of the communications devices of the first group; and controller circuitry configured in combination with the transmitter and the receiver to:

receive an indication, from the controlling entity, of a reconfigured allocation of communications resources for the D2D communications performed by the first group, the controlling entity having reconfigured an allocation of the communications resources based on an indication of interference in the communications resources and the interference being caused by signals transmitted by another communications device included in a second group of a second plurality of communications devices configured to perform D2D communications via the wireless access interface with one or more other communications devices of the second group; and transmit, in response to receiving the indication of the reconfigured allocation, the data on resources according to the reconfigured allocation to avoid interference with the signals transmitted by the another communications device.

12. A method performed by a communications device configured to perform device-to-device (D2D) communications via a wireless access interface with one or more other communications devices of a first group of a first plurality of communications devices, the communications device being any member of the first group but not a controlling entity for granting resource allocation for other communications devices of the first group, and the first group including at least one other communications device configured to transmit data in the wireless access interface to one or more of the communications devices of the first group, the method comprising:

transmitting data to one of more of the communications devices of the first group;

receiving data from one of more of the communications devices of the first group;

detecting interference in communications resources of the wireless access interface caused by signals transmitted by another communications device included in a second group of a second plurality of communications devices configured to perform D2D communications via the wireless access interface with one or more other communications devices of the second group; and providing, in response to detecting the interference, an indication of the interference to the controlling entity of the first group, wherein in response to the indication of the interference, the controlling entity reconfigures an allocation of the communications resources for the D2D communications performed by the first group, and notifies at least one of the communications devices of the first group of the of the reconfigured allocation, and in response the reconfigured allocation, the at least one of the communications devices uses the reconfigured allocation of the communications resources for the D2D communications to avoid interference with the signals transmitted by the another communications device.

13. A method performed by a communications device configured to perform device-to-device (D2D) communications via a wireless access interface with one or more other communications devices of a first group of a first plurality of communications devices, the communications device being a member of the first group but not a controlling entity for granting resource allocation for other communication devices of the first group, and the method comprising:
- transmitting data to one of more of the communications devices of the first group;
- receiving data from one of more of the communications devices of the first group;
- receiving an indication, from the controlling entity, of a reconfigured allocation of communications resources for the D2D communications performed by the first group, the controlling entity having reconfigured an allocation of the communications resources based on an indication of interference in the communications resources and the interference being caused by signals transmitted by another communications device included in a second group of a second plurality of communications devices configured to perform D2D communications via the wireless access interface with one or more other communications devices of the second group; and
- transmitting, in response to receiving the indication of the reconfigured allocation, the data on resources according to the reconfigured allocation to avoid interference with the signals transmitted by the another communications device.

* * * * *